United States Patent

Dietz

[15] 3,663,303
[45] May 16, 1972

[54] PROCESS OF MAKING A GAS DIFFUSION ELECTRODE

[72] Inventor: Hermann Dietz, Stuttgart-Giebel, Germany

[73] Assignee: Robert Bosch GmbH, Stuttgart, Germany

[22] Filed: Apr. 16, 1969

[21] Appl. No.: 816,761

[30] Foreign Application Priority Data

Apr. 17, 1968 Germany .................... P 17 71 179.4

[52] U.S. Cl. ..................... 136/122, 136/120 FC, 204/38 R
[51] Int. Cl. ..................................................... H01m 13/04
[58] Field of Search ............... 136/120 R, 120 FC, 121, 122, 136/86; 204/38.2, 140

[56] References Cited

UNITED STATES PATENTS

| | | | |
|---|---|---|---|
| 2,805,274 | 9/1957 | Eisen | 136/120 |
| 3,120,457 | 2/1964 | Duddy | 136/120 |
| 3,121,029 | 2/1964 | Duddy | 136/120 |
| 3,355,326 | 11/1967 | Semones et al. | 136/120 |
| 3,364,074 | 1/1968 | Kordesch | 136/122 |

Primary Examiner—Winston A. Douglas
Assistant Examiner—M. J. Andrews
Attorney—Michael S. Striker

[57] ABSTRACT

A porous gas diffusion electrode which is composed of a gas-permeable support and an electrically conductive catalyst layer of electrocatalytically active metal is made by applying the catalyst layer to the support in the form of a pigmented lacquer containing a metal compound forming a precursor of said catalyst, then drying or hardening the lacquer while on the support so as to adhere it thereto and thereafter subjecting the catalyst precursor compound to an activation treatment to convert the compound to the active metal and to provide the necessary porosity to the layer.

The invention also comprises a diffusion electrode which is composed of a gas-permeable, electrolyte-impermeable porous support and a porous lacquer adhered to the support and, finely distributed through said lacquer layer, a conductive material that is resistant to the conditions of operation and an electrocatalytically active metal.

The electrode of the invention is useful in fuel cells or metal-air cells, in particular as a self-breathing hydrophobic gas electrode, for the electrochemical reaction of reactive gases.

18 Claims, 3 Drawing Figures

Patented May 16, 1972 3,663,303

INVENTOR
Hermann DIETZ
By his ATTORNEY

PROCESS OF MAKING A GAS DIFFUSION ELECTRODE

BACKGROUND OF THE INVENTION

The invention relates to a process for making gas diffusion electrodes for use in metal-air batteries and fuel cells and, in particular, for making the type called self-breathing, hydrophobic gas electrodes.

The electrochemical reaction of reactive gases in galvanic cells, for instance the cathodic reduction of molecular oxygen or the anodic oxidation of molecular hydrogen is usually carried out by means of so-called gas diffusion electrodes which, because of their porous structure, their small diffusion paths and their large active surface, permit obtaining a large gas throughput at correspondingly high current densities.

These electrodes are so-called three-phase electrodes which under the operating conditions make possible the cooperation of all three components that have a part in the electrochemical reaction, that is the catalyst, the gas and the electrolyte, within the frame of one single electrode. With these electrodes the conditions for a stationary operation are selected in such a manner that the phase boundary between gas space and electrolyte space in the electrode is definitely fixed and moreover is established in close proximity to the electrochemically active electrode material.

Depending on the fixation or location of the phase boundary in the electrode, a distinction is made between hydrophilic and hydrophobic gas electrodes. The gas that is to be subjected to the electrochemical reaction in case of hydrophilic electrodes must be forced into the porous electrode body at an elevated pressure. On the other hand, in case of hydrophobic electrodes, it is possible to obtain the separation between gas space and electrolyte space by use of hydrophobic materials such as polytetrafluorethylene, silicones, paraffin, etc.

The hydrophobic electrodes are referred to also as self-breathing electrodes since they permit selectively reacting the reactive gas from a surrounding gas mixture without application of external pressure. Their main use is for fuel cells and metal-air batteries.

Gas diffusion electrodes usually comprise two layers, an external gas-permeable layer and, on the side of the electrolyte, a porous electrically conductive layer which includes the catalyst. The outer layer of the electrode which faces the gas space, in case of self-breathing electrodes, must be gas-permeable but, on the other hand, must be a barrier for the electrolyte. It must in addition support the mechanically less stable catalyst layer. Since this outer layer has no electrical function, it can be made of a non-conductive porous and hydrophobic synthetic material that permits to make the electrode comparatively light and flexible.

In the prior-art processes for making gas diffusion electrodes having a porous support of synthetic material, the application of the electroconductive catalyst layer to the support was rather complex and cumbersome. One well-known process provides, for instance, to apply a mixture of catalyst, porous substance and binder for the synthetic material to the support by means of the application of a high pressure and subsequent sintering at an elevated temperature. Other processes contemplated the application of the catalyst layer in the form of a vapor and in a vacuum with a subsequent galvanic reinforcement.

It is therefore an object of the present invention to provide for a simplified process of forming gas diffusion electrodes. It is furthermore an object of the invention to provide for a highly effective hydrophobic self-breathing gas diffusion electrode which can be made in a rather inexpensive manner.

SUMMARY OF THE INVENTION

These objects are met by applying the catalyst layer to the support of the gas diffusion electrode in the form of a metal compound forming a procatalyst or precursor of said catalyst, drying or hardening the lacquer while on the support so as to adhere it thereto and then subjecting the procatalyst compound to an activation treatment to convert the compound to the active catalyst metal and to provide the necessary porosity for the catalyst layer.

The invention also comprises a porous gas diffusion electrode comprising a gas-permeable, electrolyte-impermeable porous support, a porous lacquer layer in contact with said support and adhering thereto and, finely distributed throughout said lacquer layer, a conductive material that is resistant to the conditions of operation and an electrocatalytically active metal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
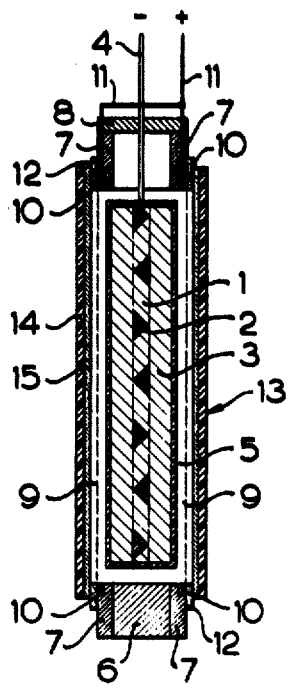
FIG. 1 shows in a vertical section a zinc-air battery with a hydrophobic gas electrode made according to the present invention.

The process of the invention is useful for the manufacture of different types of gas diffusion electrodes, that is both for hydrophobic self-breathing electrodes and for hydrophilic pressure-operated electrodes. Since it does not require expensive and cumbersome apparatus such as high-pressure devices or vapor application devices, it is possible to make electrodes of desired form or size in an easy manner with the process of the invention.

The electrochemically active layer of the electrodes of the invention comprises an electrolyte-resistant lacquer which has been made conductive by pigments incorporated therein and which is applied to a suitable support and which is given, after hardening, the necessary porosity and the catalytically active surface in the subsequent activation treatment. The solid pigment particles that are suspended in the lacquer perform two different functions. They impart the necessary conductivity to the lacquer layer and they generate a porous catalytically active inwardly extending surface in the layer.

According to a specific embodiment, the lacquer includes two types of pigments, first an inert conductive pigment and secondly the procatalyst pigment, that is, the precursor of the final electrocatalytically active metal which precursor consists of a compound of the active metal.

The lacquer coating after application is first subjected to hardening, for instance by evaporation of the solvent or by chemical reaction of the components. It is thus solidified. It is thereafter subjected to activation treatment.

One form of activation treatment and the preferred form is subjecting the electrically conductive procatalystcontaining lacquer layer to a cathodic current in a suitable electrolyte. In this kind of treatment, the procatalyst is reduced at the places where it is in direct contact with the electrolyte to the electrocatalytically active metal. This treatment therefore is identified herein as activation.

The thus-formed active metal has a higher density than the initial procatalyst compound. The electrolyte therefore occupies the thus-evacuated volume which is formed during the activation. If the procatalyst particles are present in a sufficient manner to place them in mutual contact, the reduction may thus proceed through the entire layer. Thus a coherent electrolyte-filled pore system in a matrix that is conductive to electrons may be formed wherever a catalytically active metal surface exists. If the pigment layer is applied to a hydrophobic porous base, the porous active structure formed during the activation extends to the phase boundary between wettable and non-wettable material. The gas diffusion electrode thus formed will therefore meet the requirements for a self-breathing electrode.

The procatalyst pigment may be any compound of the desired active metal which is insoluble in acids or (and) bases. In so far as an alkaline medium is concerned, these are for instance oxides, hydroxides or carbonates. Regarding an acid medium, the preferred materials are oxides.

The catalytically active metals preferably are transition metals, particularly of the group VIII or the group I of the periodic system, for instance iron, cobalt, nickel, platinum or silver.

For instance for alkaline air-breathing electrodes there may be used silver compounds such as $Ag_2O$, AgO or $Ag_2CO_3$, and for acid electrodes there may be used oxides or hydroxides of the metals of the platinum group.

The particle size of the final catalytically active metal should be between 0.1 and 10 $\mu$m, particularly between 0.1 and 0.5 $\mu$m. The procatalyst compound must be accordingly selected.

The pore volume of the catalytically active layer should be between 10 and 60 percent, preferably between 20 and 50 percent. The pore volume results in the first place from the difference of the density of procatalyst compound and catalyst metal. However, the type of layer also is of some importance since it will decrease the otherwise-resulting porosity.

It is possible, on the other hand, to increase the porosity by heating the catalyst layer during drying or by adding thereto a water-soluble pore-forming substance such as potassium chloride, KCl. It is therefore possible to vary the pore volume in a rather broad range as expressed by the above-given figures.

The pore size accordingly also may be varied rather widely and should be between 0.01 and 100 $\mu$m, particularly between 0.1 and 10 $\mu$m.

According to a preferred embodiment, there are included in the catalyst coating an inert conductive pigment material which will permit obtaining the necessary electronic conductivity. By "inert conductive material" a material is to be understood which is conductive but remains permanent or resistant under the conditions of the activation and under the conditions of operation in a metal-air cell or fuel cell, in particular must not dissolve or become modified in any manner under the action of the electrolyte or the temperature conditions.

Useful as these inert conductive pigments are all conductors and semiconductors which have a conductivity larger than 1 $\Omega^{-1}cm^{-1}$ provided, however, that they are distant under the conditions of operation which will be discussed further below. Examples of such conductive inert materials are for instance carbon, in the form of graphite or carbon black, silicon, silver, gold, copper, nickel, and certain heavy-metal borides, carbides and nitrides such as zirconium boride, $ZrB_2$, titanium carbide, TiC or vanadium nitride VN.

These pigments, just as the procatalyst, must be finely distributed in the lacquer layer.

Regarding the lacquer itself, suitable materials are lacquers which are resistant to aqueous solutions of bases or acids, depending on whether an alkaline or acid electrolyte is used, and are so resistant at concentrations of the solution up to 60 wt/% and temperatures up to 120° C, and particularly up to 80° C. Suitable examples of such materials are for instance polyester lacquers, epoxide lacquers, polyurethane lacquers and phenolic resins which all are chemically drying lacquers. There may also be used bituminous lacquers and cyclized rubber lacquers which would be physically drying lacquers. Cyclized rubbers, for instance isomers of polyisoprene with a partly cyclic structure are vulcanizable, thermoplastic and contain from 20 to 50 percent of double bonds of the initial material in the final ring, not in the aliphatic side chains. Their molecular weight is about 5,000 and they are benzene soluble and more resistant to heat than are ordinary synthetic rubber or natural rubber.

Regarding the non-conductive base to which the pigmented lacquer is applied, this base may consist of a porous hydrophobic foil of polymerizates made from halogenated hydrocarbons wherein the halogen is fluorine or chlorine. Such polymerizates are for instance polytetrafluoroethylene or polytrifluoromonochloroethylene. The pore volume of these foils should be between 5 and 80 percent and preferably between 50 and 70 percent. The pore size accordingly should be between 0.01 and 100 $\mu$m and preferably between 0.1 and 10 $\mu$m.

As for the method of activation of the procatalyst compound, the application of a cathodic current in an electrolyte has been mentioned already. However, the activation may also be effected by means of chemical reducing agents such as sodium boron hydride, $NaBH_4$, sodium hyperphosphite, $NaH_2PO_2$. Useful are furthermore photographic reducing agents which are used as developers for silver compounds such as hydroquinone, pyrocatechol, p-aminophenol and also reducing sugars such as glucose.

The concentration of the reducing agent should be between 2 and 20 grams per liter and preferably between 3 and 10 grams per liter in alkaline solution (pH 10–14). Only the sodium hyperphosphite, $NaH_2PO_2$ can also be used in an acid solution (pH 2–5). It is also possible to use hydrogen gas, $H_2$ at an elevated temperature as reducing agent for instance at a temperature up to about 200° C.

However, as already pointed out, the cathodic reduction is preferred since it is applied in a more simple manner. For the electrolytic reduction in general, it is preferred to use the same electrolyte which later is also used in the fuel cell or metal-air cell. An exception however is nickel which cannot be reduced in an alkaline manner (pH > 7) and therefore must be activated also in an acid solution in spite of the use in an alkaline battery. The electrolyte, whether alkaline or acid, should have a specific conductivity between $10^{-3}$ and 0.6 $\Omega^{-1}cm^{-1}$ This in the alkaline range is the case with aqueous solutions of hydroxides, preferably potassium hydroxide, KOH, in a concentration between 5 and 40 wt-%. In the acid range, useful are aqueous solutions of acids, preferably sulfuric acid or boric acid, in concentrations from 0.1 to 50 wt-%. The lower concentrations of the weak boric acid are preferable if there is any danger that the metal formed may dissolve in an acid that is too strong.

The current densities for the activation treatment both in the alkaline and in the acid range are from 0.1 to 500 mA/cm², preferably from 10 to 100 mA/cm². The temperatures may be in the range between −20° and +80°C. Preferably they are between +20° and +25°C.

The time of the electrolytic reduction depends on the current density applied and on the amount of oxide per cm². As a general rule, a time of 10 minutes may be useful.

This type of activation by application of an outside potential is usually carried out in special activation or test cells. As the positive counterelectrode there is used a nickel lead. It is however also possible to effect the activation in the same cell that is intended later for generating a current, for instance in a zinc-air battery, which will be discussed below and is shown in the drawing. In this case an external current source is not necessary since between the zinc electrode and the procatalyst compound, for instance a silver oxide, a potential difference already exists. The reduction of the silver oxide to the catalytically active silver can therefore be effected without applying an external current.

The formed catalytic surface permits using the oxygen of the ambient air for the electrolytic reduction. A shortcoming of this type of activation, however, is that it is not possible to operate with a well-defined current density and that sometimes conditions are not the optimum conditions for the activation.

With reference to the drawing and, in the first place, with particular reference to FIG. 1, it will be seen that 1 is a zinc electrode in which metallic zinc 3 is applied to a grid of zinc-coated iron. The electrode is provided with a terminal 4 which at its inside is conductively connected to the metal grid.

The entire electrode is surrounded by a separator 5 made of a thin transparent foil of cellulose ("cell glass") having a thickness of about 0.03 mm. A perforated polyvinylchloride foil may also be used for this purpose. The electrode 1 is disposed in a housing 6 by means of electrode holder 7 of which in the drawing of FIG. 1 only the bottom and top portion are shown and which is provided with a lid 8.

In the two section portions of the electrode holder shown in FIG. 1 there are provided openings 9. Around the edge of each opening there is formed a slot 10 by milling or a similar process for receiving a wire 11 which is coiled around the electrode and which extends upwards through the lid 8 to permit collecting the generated current.

The edges of the two openings 9 are provided with an electrically conductive lacquer 12 which also surrounds the wire disposed in the slot 10. The hydrophobic gas electrode 13 is placed in contact with its conductive phase with that lacquer. Thus, a conductive fluid-tight connection is formed between the electrode 13 and the current terminal 11.

The electrolyte used in the cell may be a 6n potassium hydroxide solution.

Figure 2:
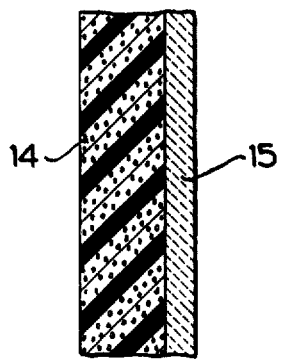
FIG. 2 shows in section and on an enlarged scale a hydrophobic gas electrode made by the process of the invention.

FIG. 2 illustrates the hydrophobic gas electrode 13 on a larger scale. The electrode comprises a porous nonconductive hydrophobic foil 14 and a catalytically active lacquer 15 which is firmly adhered to the foil 14 and contains the electrically conductive pigments.

Figure 3:
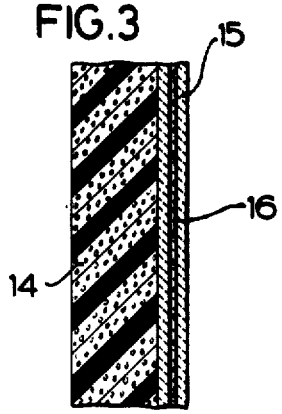
FIG. 3 shows the same type of hydrophobic gas electrodes which is provided, however, with a metal grid in the catalyst layer.

In case it is desired to provide for rather high currents, it is possible to include a wire grid 16 in the lacquer as shown in FIG. 3. The lacquer 15 is then applied to the wire grid 16. This wire grid may be formed of metals such as nickel, copper, silver, gold, platinum metal, special steels (refined steels) or the like.

The following two examples will illustrate the making and structure of the electrode.

EXAMPLE 1

1 g of polyurethane lacquer containing 20 percent solids was finely ground with 2 g of a finely subdivided silver powder having a particle size of 5 $\mu$m and 2 g silver oxide having a particle size smaller than 35 $\mu$m. To the mass there was then added dropwise a sufficient amount of xylene to obtain a homogeneous viscous paste which could be applied by brushing. This paste was applied then to a 60 cm$^2$ large hydrophobic polytetrafluoroethylene foil ("Teflon MPTE 70" of the General Plastics Corporation) of a thickness of 0.25 mm. With reference to the drawing, this foil is indicated there by the reference numeral 14. The lacquer was then dried at 50° C and thus formed a firmly-adhering coating 15 on the Teflon foil 14. The drying was effected in a revolving air drier tank so that the solvent was completely removed from the pigment lacquer.

The coated and dried foil was then installed in the electrode holder indicated as 7 in the drawing. The electrode holder was formed of polymethacrylic acid ester sold under the tradename "Plexiglass." The wire shown at 11 in the slot 10 for discharge of the electric current was a copper wire. The conductive lacquer 12 was pigmented with silver and applied by brushing. The coated and dried foil was then applied by pressure to the lacquer layer with its conductive side. There was thus formed as previously indicated an electrically conductive, fluid-tight connection between the electrode 13 and the electrode holder 7.

This device was now installed in an activation and testing cell. This type of cell was of a similar structure as the zinc-air battery shown in FIG. 1. However, it had provision for receiving only one air-breathing electrode while the other end was closed. It furthermore contained a nickel wire grid as counterelectrode instead of the zinc electrode indicated as 1 in FIG. 1.

The cell was then filled with 6 N potassium hydroxide and connected to a current source so that the nickel wire grid was connected with the positive pole and the electrode which was to be activated with the negative pole. The potential was adjusted to obtain a current density of 50 mA/cm$^2$.

After application of this type of current for 10 minutes, all silver oxide had been reduced to silver. The electrode could now commence operating as a self-breathing electrode. There was then measured the potential in a separate testing circuit. This was done by means of a Luggin capillary with built-in hydrogen electrode which extended close to the electrode to be measured. At a potential of 50 mA/cm$^2$ a potential of 860 mv, was measured against the hydrogen electrode in the same solution.

Two of these self-breathing electrodes were then installed in the zinc-air battery shown in the drawing in FIG. 1. This battery then had a potential at rest of about 1.4 V. At a discharge current density of 20 mA/cm$^2$ the discharge potential was 1.2 V.

EXAMPLE 2

This example illustrates the making of a self-breathing air electrode for use in an acid electrolyte.

A pigmented paste for applying by brushing was first formed of 1 g of cyclo rubber (15 percent cyclo rubber resin and 85 percent benzene), 5 g gold powder having a particle size smaller than 10 $\mu$m and 1 g of platinum dioxide having a particle size smaller than 35 $\mu$m. This paste was applied in the same manner as in Example 1 to a polytetrafluoroethylene foil of a size of 100 cm$^2$ and subjected to drying. As described in the previous example, the coated foil was then placed in an electrode holder and installed in an activating cell.

The electrolyte used in the activating cell in this case, however, was 2 N sulfuric acid. The activation was again effected by cathodic reduction of the platinum dioxide. This was done by applying a current source with the positive pole to the inert metal grid and connecting the negative pole to the electrode that was to be reduced. The potential was adjusted to obtain a current density of 50 mA/cm$^2$. After about 15 minutes the reduction was complete and the stationary potential which was measured as described in Example 1 showed a value of 820 mv.

Two of the electrodes which had been made and activated in this manner were then installed in a fuel cell which in general principle has the same structure as the metal air cell shown in FIG. 1. However, there is the difference that in the fuel cell a fuel electrode is provided instead of the metal electrode. Anode and cathode space are also connected by a membrane. In the anode space there is a mixture of 5 N sulfuric acid and 3 moles of methanol while the cathode space contained only 5 N sulfuric acid.

The fuel electrode is an immersion electrode. It consisted of a porous polyethylene-carbon support which contained a platinum-ruthenium-Raney catalyst. This type of fuel cell had a potential at rest of 1.05 V. At a discharge current of 30 mA/cm$^2$ it had a discharge potential of 0.62 V.

Regarding the composition of the lacquer it will be understood that while the preferred embodiment includes an inert conductive material in the lacquer, it is possible to form an electrode without this component. Activation by application of an electric potential in this case would proceed from the periphery of the electrode and in this direction the electrode would gradually become electrically conductive to the extent that the added procatalyst was reduced to the active catalyst metal. However, activation under optimum conditions is possible only when an inert conductive metal is added. This will provide also for a higher mechanical stability.

Regarding the general composition of the conductive lacquer coating, the following is noted. The lacquer may contain from 1 to 30 percent, preferably about 20 percent, solids.

There should be 0.1 to 10 g conductive material per gram of lacquer. The range can be held rather broad since the more important point is the density or volume of the conductive material and not the weight. Thus, it is possible when using carbon to employ relative to the weight a much smaller amount than in case of metal, since the density of carbon to metal is at least of the ratio 1:5. In other words, a specific volume of metal has at least five times the weight of the same volume of carbon.

The ratio of inert conductive material to procatalyst may be between 10:1 and 1:1. Preferably, it is around 1:1.

What is claimed as new and desired to be protected by Letters Patent is set forth in the appended claims.

1. Process for making a self breathing porous gas diffusion electrode consisting of a gas permeable hydrophobic non-conductive resin support and a porous electrically conductive hydrophobic catalyst layer adhered to one surface of a support for use in a fuel cell or metal-air cell which comprises applying to one surface of said support a viscous past-like pigmented lacquer containing a solvent, a film forming substance as base material which is resistant at temperatures up to 120° C to aqueous bases or acid solutions in a concentration of up to 60 percent by weight, an inorganic metal compound insoluble in acids and bases constituting a procatalyst and an inert electrolyte resistant electrically conductive material, hardening said lacquer causing the same to adhere to said support and thereafter subjecting the procatalyst present in said lacquer to an activation treatment by reduction by means of application of a cathodic current in an electrolyte whereby the procatalyst is converted into an electrocatalytically active metal and a porous layer containing said catalyst and conductive materials formed on said support.

2. Process according to claim 1 wherein the activation is effected by application of a cathodic current and the electrolyte employed in the activation treatment is the same electrolyte as employed in the final use of the electrode in a fuel cell or metal-air cell.

3. Process according to claim 1 wherein the activation is effected by application of a cathodic current abd the current applied during the activation is from 0.1 to 500 mA/cm$_2$ and the temterature employed is between —20° and +80° C.

4. Process according to claim 1 wherein the activation is effected by application of a cathodic current and the current applied during the activation is from 10 to 100 mA/cm² and the temperature is between +20° and +25° C.

5. Process according to claim 1 wherein said procatalyst is a compound of iron, cobalt, nickel, platinum, copper or silver.

6. Process according to claim 1 wherein said inert electrolyte resistant electrically conductive material has a conductivity greater than $1\Omega^{-1}cm^{-1}$.

7. Process according to claim 1 wherein said inert electrolyte resistant electrically conductive material is graphite, carbon black, silicon, zirconium bromide, titanium carbide, vanadium nitride, silver, gold, copper or nickel.

8. Process according to claim 1 wherein a hydrophobic material is employed for the said support and substantially all of said procatalyst up to the surface boundary between the lacquer and the said hydrophobic support is subjected to said activation whereby a self-breathing gas diffusion electrode is provided having a hydrophobic and a hydrophilic portion.

9. Process according to claim 1 which comprises selecting the amount of procatalyst compound and the ratio of volume of procatalyst compound to volume of catalyst to provide a substantially coherent pore system in an electroconductive matrix upon reduction of the volume of the procatalyst compound to the volume of the final active catalyst metal in said reduction step.

10. Process according to claim 1 including the step of embedding a metal grid in said lacquer prior to the hardening thereof in order to permit the discharge of relatively high currents.

11. Process according to claim 1 which comprises selecting the ratio of volume of procatalyst to volume of final catalyst to provide for a pore volume of from 10 to 60 percent at a particle size of the final active catalyst metal between 0.1 and 10 $\mu$.

12. Process according to claim 11 wherein the procatalyst is in the form of a silver or platinum oxide of a particle size below 35 $\mu$.

13. Process according to claim 11 which comprises selecting said ratio and the materials for the support to provide for said particle size and for a pore volume between 5 and 80 percent and for a pore size from 0.01 to 100 $\mu$.

14. Process according to claim 13 wherein the porosity is produced by including a pore forming agent in the initial lacquer and heating to a temperature at which said pore forming agent is decomposed prior to heat hardening.

15. Process for making a self breathing porous gas diffusion electrode consisting of a gas permeable hydrophobic non-conductive resin support and a porous electrically conductive hydrophobic catalyst layer adhered to one surface of a support for use in a fuel cell or metal-air cell which comprises applying to one surface of said support a viscous past-like pigmented lacquer containing a solvent, a film forming substance as base material which is resistant at temperatures up to 120° C to aqueous bases or acid solutions in a concentration of up to 60 percent by weight, an inorganic metal compound insoluble in acids and bases constituting a procatalyst and an inert electrolyte resistant electrically conductive material, hardening said lacquer causing the same to adhere to said support and thereafter subjecting the procatalyst present in said lacquer to an activation treatment by reduction by application of a chemical reducing agent whereby the procatalyst is converted into an electrocatalytically active metal and a porous layer containing said catalyst and conductive materials formed on said support.

16. Process according to claim 15 wherein the activation is effected by application of a chemical reducing agent by reacting the procatalyst compound with sodium boron hydride, sodium hyperphosphite or a photographic developer adapted for reduction of silver halide compositions or a reducing sugar.

17. Process according to claim 16 wherein the reducing agent is employed in a concentration of from 2 to 20 g/l.

18. Process according to claim 15 wherein the activation is effected by application of a chemical reducing agent by applying hydrogen gas at an elevated temperature of up to 200° C.

* * * * *